(12) United States Patent
Hawkins et al.

(10) Patent No.: US 9,908,533 B1
(45) Date of Patent: Mar. 6, 2018

(54) SYSTEM FOR EXITING A VEHICLE TRANSPORT MODE AND METHODS THEREOF

(71) Applicant: Honda Motor Co., Ltd., Tokyo (JP)

(72) Inventors: Kevin Hawkins, Yorba Linda, CA (US); Atsushi Kurauchi, Tochigi (JP); Charles J Franklin, II, Huntington Beach, CA (US); Kiyomi Catalina Ito, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/296,962

(22) Filed: Oct. 18, 2016

(51) Int. Cl.
*B60W 50/00* (2006.01)

(52) U.S. Cl.
CPC . *B60W 50/0098* (2013.01); *B60W 2050/0087* (2013.01); *B60W 2050/0096* (2013.01)

(58) Field of Classification Search
CPC ..... B60W 50/0098; B60W 2050/0087; B60W 2050/0096
See application file for complete search history.

(56) References Cited

U.S. PATENT DOCUMENTS

| | | | |
|---|---|---|---|
| 7,171,300 B1 * | 1/2007 | Anderson | F02D 41/042 701/112 |
| 7,474,942 B2 | 1/2009 | Patenaude | |
| 7,599,843 B2 | 10/2009 | Watkins et al. | |
| 8,180,521 B2 | 5/2012 | Enomoto et al. | |
| 8,688,310 B2 * | 4/2014 | Brunou | B60T 8/1755 188/265 |
| 8,830,124 B1 * | 9/2014 | Akbari | G01S 19/13 342/357.26 |
| 8,983,711 B2 * | 3/2015 | Brunou | B60T 8/1755 701/1 |
| 9,141,535 B2 | 9/2015 | Kondoh | |
| 9,148,743 B2 | 9/2015 | Timm et al. | |

(Continued)

FOREIGN PATENT DOCUMENTS

| | | |
|---|---|---|
| DE | 102008061957 A1 | 9/2009 |
| DE | 102010015180 A1 | 12/2010 |

OTHER PUBLICATIONS

"Disabling Transport Mode" Published on Aug. 21, 2012, http://sandyblogs.com/techlink/?p=997.

(Continued)

*Primary Examiner* — Alex C Dunn
(74) *Attorney, Agent, or Firm* — Honda Patents & Technologies North America, LLC; Aaron C. Fong (57) ABSTRACT

The systems and methods provided herein are directed to exiting a vehicle from transport mode using a sequence or operation performed by two or more users. In an illustrative embodiment, the vehicle may include a first system and a second system. The first system may be activated by a sequence of pedal presses to either the brake or acceleration pedal. The second system may be activated by a trunk open request or battery connection. A control system within the vehicle may exit the transport mode when the first system and second system have been activated within a predetermined time. The predetermined time may be based on a distance between the first system and the second system such that a single user may not activate both systems. The predetermined time may be less than a time to travel a distance between the first system and the second system.

20 Claims, 7 Drawing Sheets

(56) References Cited

U.S. PATENT DOCUMENTS

| | | | | |
|---|---|---|---|---|
| 9,415,770 B2* | 8/2016 | Holub | ............... | F02D 28/00 |
| 2010/0292921 A1* | 11/2010 | Zachariah | ............ | G06Q 10/00 |
| | | | | 701/533 |
| 2011/0158851 A1* | 6/2011 | Kitagawa | ........... | G01N 35/0092 |
| | | | | 422/67 |
| 2012/0158239 A1* | 6/2012 | Brunou | ............. | B60T 8/1755 |
| | | | | 701/29.1 |
| 2013/0073155 A1* | 3/2013 | Conti | ............... | B60W 10/06 |
| | | | | 701/56 |
| 2015/0094937 A1 | 4/2015 | Holub | | |
| 2015/0197160 A1 | 7/2015 | Buecherl | | |
| 2015/0325291 A1 | 11/2015 | Aue | | |

OTHER PUBLICATIONS

"Nissan Installation Instructions" Published on Apr. 28, 2015, http://www.nissan-techinfo.com/asistgc_1/diskdocs/1/T/U/1TU16.PDF.

"Subaru Vehicle Handling Manual" Published on Nov. 2013 http://www.mpa.maryland.gov/_media/client/qchat/Subaru_Handling_Manual.pdf.

* cited by examiner

SYSTEM FOR EXITING A VEHICLE TRANSPORT MODE AND METHODS THEREOF

BACKGROUND

Manufactured vehicles may spend a large amount of time in storage and transit before arriving at a vehicle dealership. Depending on the length of time, electrical loads may drain the battery prior to the vehicle arriving at the dealership. Components within the vehicle may also be affected during transit. For example, shocks within the vehicle may be over exerted during transportation. Speed and power configurations may be damaged as well. To overcome these concerns, vehicle manufacturers have developed transport modes.

In a transport mode, low power electrical modes may be implemented to reduce power consumption. For example, a transmission control unit may be completely shut down to save power. Parameters within the vehicle may also be controlled to reduce the amount of damage caused by vibration of the vehicle when shipped. A stiffer suspension may be used to mitigate rough terrain when being transported. Speed and power configurations may be reduced to ensure that the vehicle may be driven a short distance.

Prior to being sold or used, the dealership, or other party, may exit the transport mode from the vehicle and place the vehicle into a normal mode. Different manufacturers and suppliers may use different operations to exit the transport mode. For example, a user may exit the transport mode by starting the engine, activating hazard lights, pressing a brake pedal and pressing and holding the start/stop button. Some transport modes may be exited through a specialized dealership tool. Other more automated methods may include over-the-air updates where once the vehicle is at a location, as detected by a global positioning system (GPS), software may be downloaded to exit the transport mode.

The described operations may be complicated and further, may be executed by a single party. Drawbacks from a single party system may include accidental exiting of the transport mode. Furthermore, single party transport mode exiting may lead to thefts. The present disclosure provides a system and method thereof that addresses these concerns. Other benefits and advantages will become clear from the disclosure provided herein and those advantages provided are for illustration.

BRIEF DESCRIPTION

According to one exemplary embodiment, a method for taking a vehicle out of a transport mode that limits functions of the vehicle is provided. The method may include determining whether a first action on a first system has occurred on the vehicle, determining whether a second action on a second system has occurred on the vehicle, wherein the first system and the second system on the vehicle are separated by a distance and exiting the transport mode from the vehicle when the first action and the second action have occurred within a predetermined time, wherein the predetermined time is less than a time to travel the distance between the first system and the second system.

According to another exemplary embodiment, a vehicle in a transport mode limiting functions of the vehicle is provided. The vehicle may include a first system activated in the vehicle, a second system activated outside the vehicle and a control system exiting the transport mode returning the functions of the vehicle when the first system and second system have been activated within a predetermined time, wherein the predetermined time is less than a time to travel between the first system and the second system.

According to yet another exemplary embodiment, a vehicle computing system is provided. The system may include at least one processor and a memory operatively coupled to the processor, the memory storing program instructions that when executed by the processor, causes the processor to perform processes. The processes may include establishing a transport mode limiting functions to the vehicle, determining whether an in-vehicle system is activated, determining whether an out-of-vehicle system is activated and exiting the transport mode when the in-vehicle system and the out-of-vehicle system are activated within a predetermined time returning normal functions to the vehicle, wherein the predetermined time is less than a time to travel between the in-vehicle system and the out-of-vehicle system.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, the systems and methods provided herein are directed to exiting a vehicle from transport mode using a sequence or operation performed by two or more users. In an illustrative embodiment, the vehicle may include a first system and a second system. The first system may be activated by a sequence of pedal presses to either the brake or acceleration pedal. The second system may be activated by a trunk open request or battery connection. A control system within the vehicle may exit the transport mode when the first system and second system have been activated within a predetermined time. The predetermined time may be based on a distance between the first system and the second system such that a single user may not activate both systems. The predetermined time may be less than a time to travel a distance between the first system and the second system.

Figure 1:
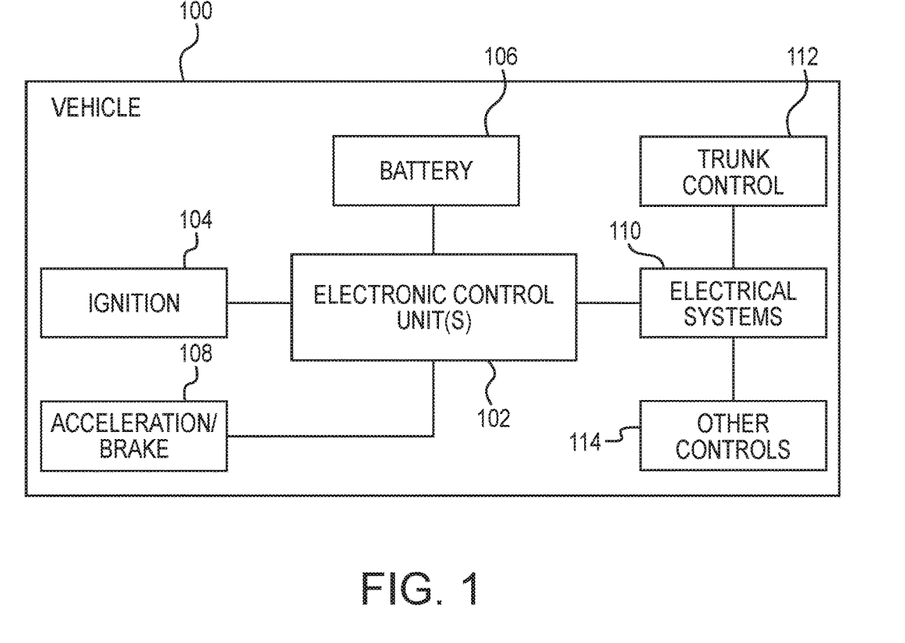
FIG. 1 is a schematic diagram of illustrative vehicle components for exiting a vehicle transport mode in accordance with one aspect of the present disclosure.
Figure 2:
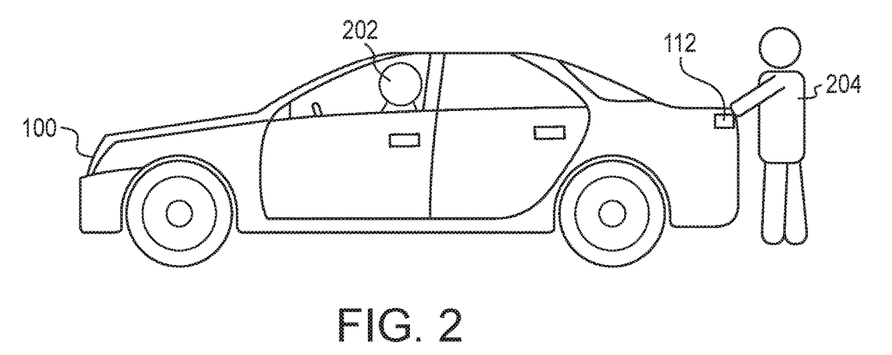
FIG. 2 is a schematic diagram of an illustrative two user team for exiting a vehicle transport mode in accordance with one aspect of the present disclosure.
Figure 3:
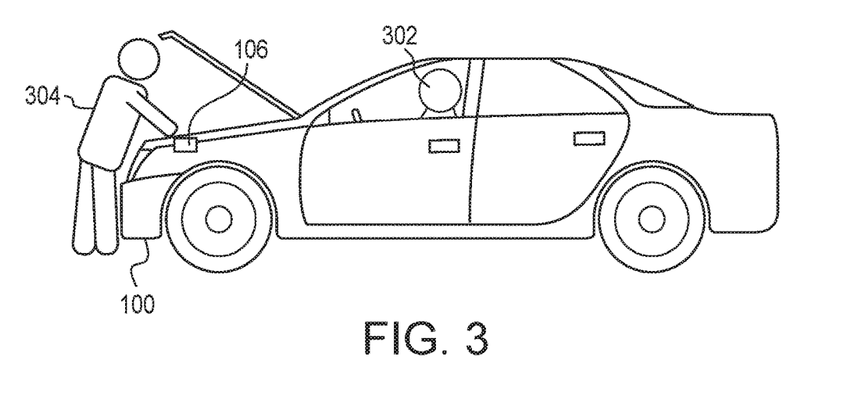
FIG. 3 is a schematic diagram of another illustrative two user team for exiting a vehicle transport mode in accordance with one aspect of the present disclosure.

Numerous other modifications or configurations to the system and methods thereof will become apparent from the description provided below. Advantageously, the system may exit accidental releases of the transport mode. Furthermore, and by requiring more than a single party, fewer thefts may occur. Other advantages will become apparent from the description provided below. FIG. 1 will show components within the vehicle to exit the transport mode. FIGS. 2 and 3 depict exemplary environments for exiting. FIGS. 4 through 8 provide flow charts for providing illustrative processes.

Turning now to FIG. 1, a schematic diagram of illustrative vehicle components for exiting a vehicle transport mode in accordance with one aspect of the present disclosure is provided. The vehicle 100 may include, but is not limited to, electronic control units (ECUs) 102, ignition 104, battery 106, acceleration/brakes 108 and/or electrical systems 110 that may include a trunk control 112 and other controls 114. Fewer or more components may be provided within the vehicle 100 and the vehicle 100 is not limited to those components shown. The components may be connected through a bus or other connection.

The ECUs 102 of the vehicle 100 may be programmed to place the vehicle 100 into transport mode, normal mode and/or variation thereof. One or many ECUs 102 may be provided within the vehicle 100. The ECUs 102 may be control systems for receiving input and providing output as well as managing the data. The ECUs 102 may include at least one processor and memory. Computer programs may be typically stored in the memory of the ECUs 102 until they are ready for execution, at which time the programs are brought into the memory so that they can be directly accessed by the processor. The processor may select a part of memory to read and/or write by using an address that the processor gives to the memory along with a request to read and/or write. The reading and interpretation of an encoded instruction at an address causes the processor to fetch a subsequent instruction, either at a subsequent address or some other address.

Typically, ECUs 102 may be embedded systems that control one or more systems or subsystems within the vehicle 100. These systems and subsystems include, but are not limited to, the engine, powertrain, transmission control module, brake control module, central control module, central timing module, general electronic module, security control module, entry system modules, body control module, suspension control module and/or similar modules. The ECUs 102 may also control the telematics unit including functionality as well as power reduction on the unit.

The ECUs 102 may be programmed to place the electrical systems 110 of the vehicle 100 in a sleep state or transport mode to reduce power consumption and thereby preserve life within the battery 106 while providing the vehicle 100 with limited functionality. For example, the ECUs 102 may place limits, through an engine control, such that the vehicle 100 may be driven for a short distance. Other limits may be placed on the vehicle's maximum speed limit, for example, vehicles 100 in transport mode may be limited to travelling below fifty miles per hour.

In one embodiment, the operations to exit the transport mode may begin by activating the ignition 104 of the vehicle 100. The ignition 104 may be typically set in an off position when transported. The vehicle 100, for purpose of exiting the transport mode, may be placed in an awaken state when the ignition 104 has been turned on. By placing the vehicle in a sleep state, the power within the vehicle 100 may be reduced and the battery 106 may be preserved. The ignition 104 may place the vehicle 100 in an awaken state when the key is set at a predetermined position. For example, the key may be placed into the ignition 104 in the lock/off position. Other positions such as the accessory position, on/run position and/or start position may be used to wake up the vehicle 100 for beginning the process to exit the transport mode.

In one illustrative example, using the accessory position, the user may wake up the vehicle 100 by placing their key into the ignition 104 at the lock/off position. The user may then turn their key counter clockwise to the accessory position for a period of time to wake up their vehicle 100 while in a transport mode. The transport mode may then be exited using the two or more user team which will be described in detail below.

Keyless systems for ignition 104 such as those embedded within key fobs may be used to wake up the vehicle 100 to exit the vehicle 100 from transport mode. A sequence pressed by the user on the key fob may be used to wake up the vehicle 100. Typically, however, keyless systems may not work as they may be shut down to preserve battery life in a transport mode. In such variations, the transport mode may be exited through another sequence or without waking up the vehicle. Alternatively, a valet key may be used. Pushbuttons may also be used. Pushbuttons for activating the vehicle 100 may be activated when the key fob is within a predetermined distance of the vehicle 100, for example, when the user is within the vehicle and the key fob is a foot away from an internal vehicle sensor.

Continuing with FIG. 1, and in accordance with one embodiment which will be provided in detail below, a connection with a battery 106 may be used to exit the transport mode. The battery 106 may be connected allowing a predetermined time, for example five seconds, for another user to activate another system for exiting the transport mode. The ECUs 102 may determine whether a battery 106 has been connected by monitoring power levels provided by the battery 106. In one embodiment, a switch may be flipped to alert the ECUs 102 when the battery 106 has been connected.

The vehicle 100 may also include acceleration/brakes 108. Pedals may be associated with both or either of the acceleration/brakes 108. The pedals may be pushed or pressed and the sequence or signals created therefrom may be monitored by the ECUs 102. The ECUs 102 may determine whether the correct sequence has been provided to exit the transport mode. A single push of the pedal may be used to create a first action for exiting the transport mode. In another example, five consecutive pushes of the pedal for the acceleration/brakes 108 may begin the exiting of the transport mode.

The ECUs 102 of the vehicle 100 may control electrical systems 110. The electrical systems 110 may be limited or restricted when the vehicle 100 is in a transport mode. Electrical systems 110 may include, but are not limited to, the engine, powertrain, transmission control, brake control, central control, central timing, general electronics, body control, suspension control and/or similar systems.

In one embodiment, the trunk control 112, which may be part of the electrical systems 110, may be used to exit the transport mode. In the transport mode, a trunk control request would not open the trunk, rather a request may be sent to the ECUs 102 where the request would be processed and the transport mode may be exited if proper actions have been taken including a first action by a first user.

Other controls 114 as part of the electrical systems 110 may be limited in a transport mode. In one example, the power train of the vehicle 100 may be limited by the ECUs 102. By limiting the power, the maximum speed of the vehicle 100 may be restricted while in the transport mode. In another example, functionality for the telematics unit may be limited by the other controls 114. Power may be limited to the telematics unit or completely shut down while in transport mode. The other controls 114 may reduce lights on the vehicle 100. Some lights may be shut down or their intensity may be reduced. In another example, other controls 114 may limit the doors and sunroof from being opened.

FIG. 2 is a schematic diagram of an illustrative two user team for exiting a vehicle transport mode in accordance with one aspect of the present disclosure. Exiting the transport mode may involve two or more users including a first user 202 and a second user 204. By having the first user 202 and second user 204, the likelihood of exiting the transport mode accidentally may be reduced. As shown, the first user 202 may be in the vehicle 100 while the second user 204 may be outside the vehicle 100. For purposes of this disclosure, the terms "first user" and "second user" may be interchanged and should not be construed as limiting. For example, the first user 202 may be outside the vehicle 100 and the second user 204 may be inside the vehicle 100.

As shown, the first user 202 may press the pedals for the acceleration/brake 108 to create a first action to exit the transport mode. A sequence of pedal presses may be used to trigger the exiting of the transport mode. The ECUs 102 may determine whether a correct sequence has been pressed through pattern recognition. Alternatively, a longer push may be recognized as the first action. The second user 204, at or near the time that the first user 202 presses the pedals for the acceleration/brake 108, may press the trunk control 112 to create a second action to exit the transport mode. The actions by both the first user 202 and the second user 204 thus may cause the exiting of the transport mode.

Above, the first user 202 began the first action by pressing the pedals for the acceleration/brake 108. The second user 204 provided the second action by pressing the trunk control 112. When both actions occurred with a predetermined time, for example five seconds, the transport mode was exited. Alternatively, and in accordance with this disclosure, the second user 204 may initiate the first action by pressing the trunk control 112 and then the first user 202 may provide the second action by pressing the pedals for the acceleration/brake 108.

Selecting the predetermined time to exit the transport mode may be based on preventing a single user from performing both actions. For example, a period of five seconds may prevent a single user from pressing the trunk control 112 and then pushing on the acceleration/brake 108. The predetermined time may thus be based on a distance between the two systems, i.e., the acceleration/brake 108 and the trunk control 112. The five seconds may be too short for a single user to push the acceleration/brake 108 and then go the distance to press the trunk control 112. Similarly, five seconds may be too short for a user to press the trunk control 112 and then push the acceleration/brake 108. The predetermined time may be less than a time for either user 202 or 204 to travel a distance between the first system and the second system. Shorter or longer durations of predetermined times may be used. However, the time may be limited by preventing a single user from performing both actions by traveling the distance between the two systems.

FIG. 3 is a schematic diagram of another illustrative two user team for exiting a vehicle transport mode in accordance with one aspect of the present disclosure. The two user team may include a first user 302 within the vehicle 100 and a second user 304 outside the vehicle 100. Similar to before, the actions performed by the first user 302 may be interchanged with the actions performed by the second user 304. Two or more users, in accordance with this configuration, may be used to exit the transport mode.

As shown, the first user 302 may provide a first action to exit the transport mode by pressing pedals for the acceleration/brake 108. A sequence of pedal presses may be used to trigger the exiting of the transport mode. Alternatively, a single push may be used. The ECUs 102 may determine whether a correct sequence has been pressed. At or around the same time, the second user 304 may provide a second action by connecting the battery 106 to the vehicle 100. Connection of the battery 106 may be performed by the second user 304 who may attach battery cables to the terminals of the battery 106. Often times, the transport mode has been stored in non-erasable memory and when the battery 106 has been connected, the vehicle 100 wakes up or powers on in a previously set mode, i.e., transport mode. When both actions occur within the predetermined time, the transport mode may be removed.

Above, the first user 302 began the first action by pressing the pedals for the acceleration/brake 108. The second user 304 provided the second action by connecting the battery 106. When both actions occurred with a predetermined time, for example five seconds, the transport mode was exited. Alternatively, and in accordance with this disclosure, the second user 304 may initiate the first action by connecting the battery 106 and then the first user 302 would provide the second action by pressing the pedals for the acceleration/brake 108.

Selecting the predetermined time to exit the transport mode may be based on preventing a single user from performing both actions by traveling a distance to both systems. For example, a period of five seconds may prevent a single user from connecting the battery 106 and then traveling the distance to push the acceleration/brake 108. Similarly, the five seconds may be too short for a single user to push the acceleration/brake 108 and then travel the distance to connect the battery 106. The predetermined time may be less than a time for either user 302 or 304 to travel a distance between the first system and the second system. Shorter or longer durations of predetermined times may be used. However, the time may be limited by preventing a single user from performing both actions. Accordingly, the predetermined time reflects the distance between the two systems.

As shown above in FIGS. 2 and 3, one user was within the vehicle 100 and another user was outside. In another configuration, both users may be outside the vehicle 100 where the first user would connect the battery 106 and a second user would press the trunk control 112 to exit the transport mode. Both actions would occur within a predetermined time based on the distance between the systems such that a single user may not disable the transport mode. In another example, both users may be in the vehicle 100. One user may press on the pedals for the acceleration/brake 108 while another user may adjust window settings in the back. The predetermined time for executing both actions may be shortened or lengthened dependent on removing execution of both actions by a single user. The predetermined time may be less than a time to travel a distance between the systems. Typically, the predetermined time may be based on the distance between the systems for exiting the transport mode.

In one embodiment, three or more actions may be used for exiting the transport mode. Three or more users may perform these actions within a predetermined time based on the distance between the systems. For example, a first user may push the pedals for the acceleration/brake 108, a second user may press the trunk control 112 and a third user may connect the battery 106 within a predetermined time to exit the transport mode. The predetermined time may be shorter than configurations having two users. Other configurations may exist for using multiple users and is not limited to those described above.

Figure 4:
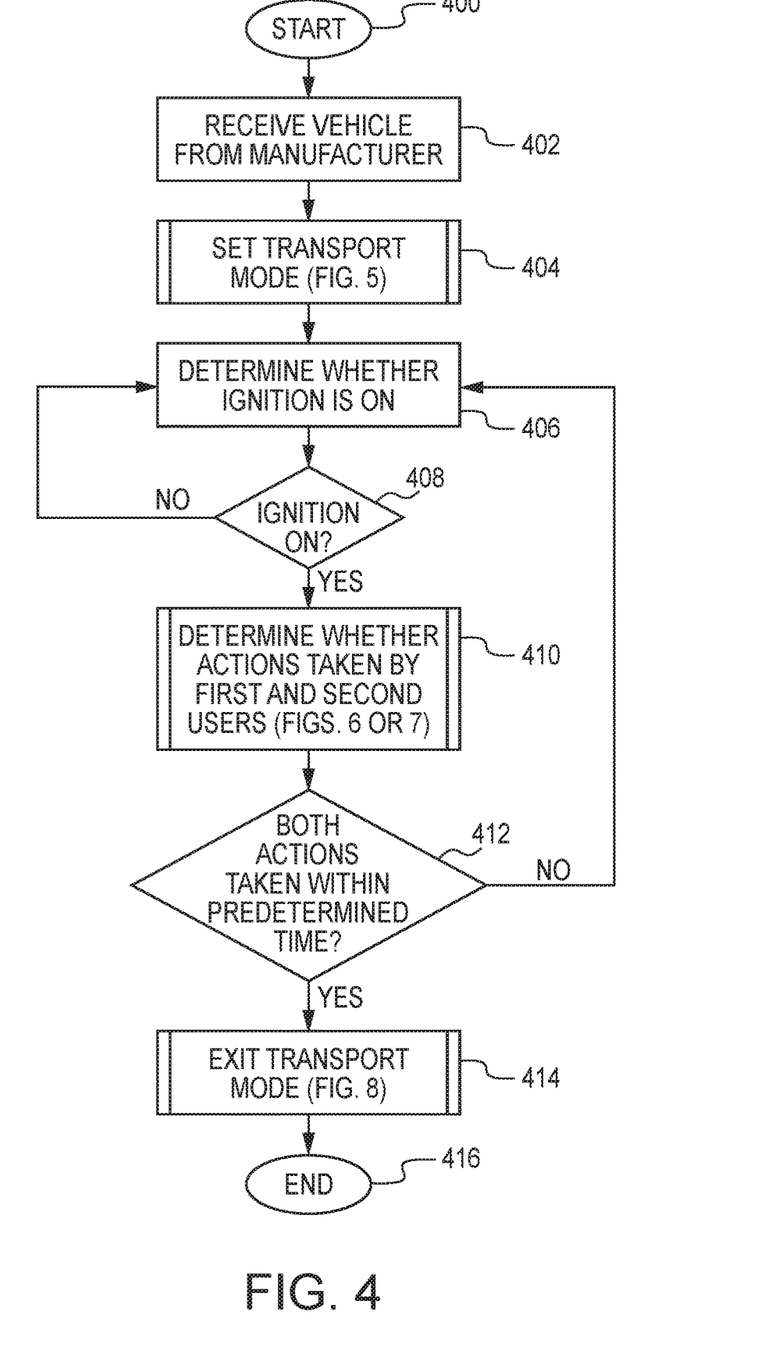
FIG. 4 is an exemplary flow chart showing illustrative processes for establishing the transport mode and exiting it in accordance with one aspect of the present disclosure.

FIG. 4 is an exemplary flow chart showing illustrative processes for establishing the transport mode and exiting it in accordance with one aspect of the present disclosure is provided. Fewer or more processes may be used and should not be limited to those provided. The processes may begin at block 400. At block 402, the vehicle 100 may be received from the manufacturer and newly produced. Alternatively, the vehicle 100 may be a vehicle having its transport mode reinstalled or reset.

At block 404, the transport mode may be set within the vehicle 100. Exemplary processes for setting the transport mode will be described in FIG. 5. The transport mode may reduce functions within the vehicle 100. These functions may be, but are not limited to, the powertrain, engine, controls, lights, telematics units, etc. Typically, the transport mode may be set before the vehicle 100 leaves the factory, however, this mode may be set at a number of other locations in the distribution chain.

Upon arriving at the dealership, where the vehicle 100 may be sold, processes for exiting the transport mode may begin. The transport mode may also be exited at other locations. The processes described above are for illustrative purposes and should not be construed as limiting. At block 406, the ECUs 102 within the vehicle 100 may determine whether the ignition 104 is on. Turning the ignition 104 on may "wake up" the vehicle 100 from a sleep mode as described above. Key or keyless systems may be used to determine whether the ignition 104 is on or off.

Figure 6:
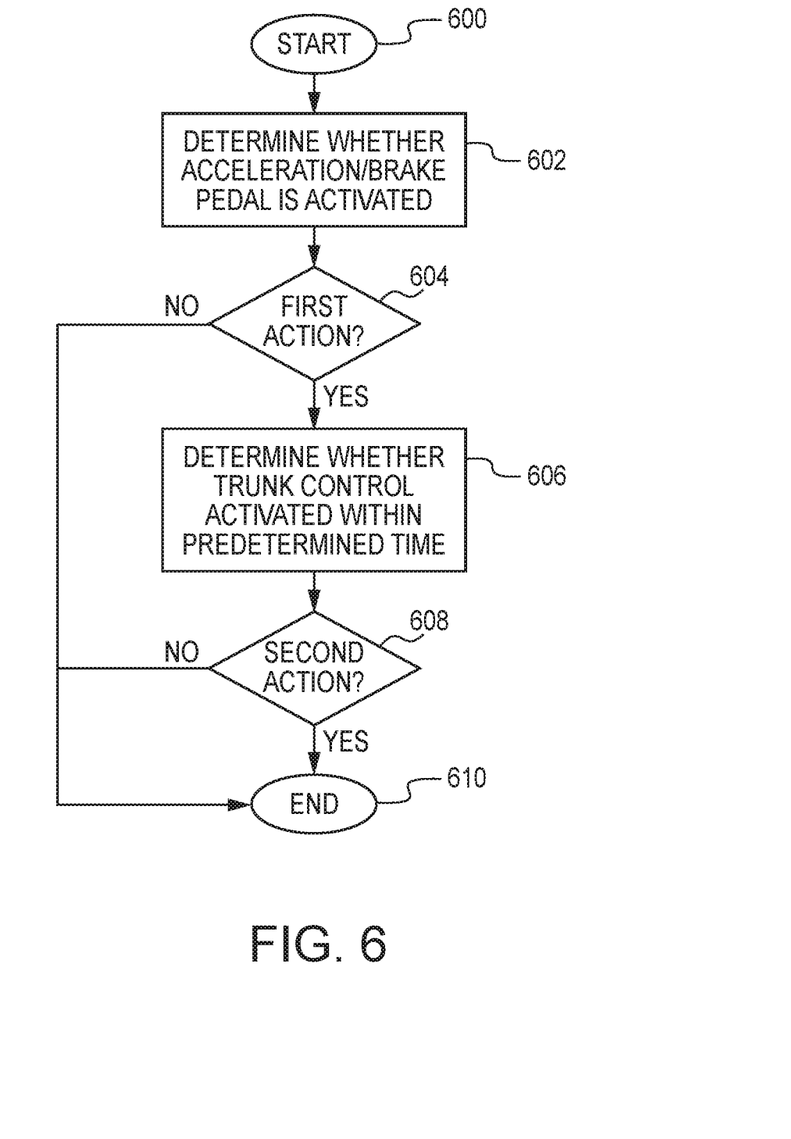
FIG. 6 is an exemplary flow chart showing illustrative processes for actions taken by a first user and a second user to exit the transport mode in accordance with one aspect of the present disclosure.
Figure 7:
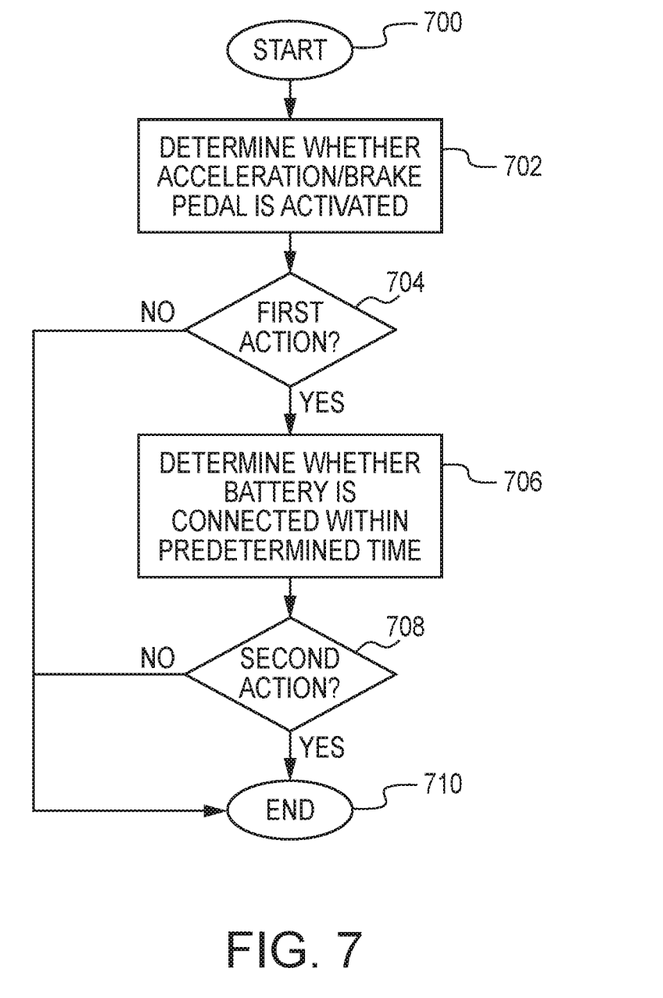
FIG. 7 is another exemplary flow chart showing illustrative processes for actions taken by a first user and a second user to exit the transport mode in accordance with one aspect of the present disclosure.

At decision block 408, the processes may return back to block 406 when the ignition 104 is off. Otherwise, and when the ignition 104 is on, the processes continue to block 410 where the ECUs 102 determine whether actions have been performed by the first and second user within a predetermined time. The predetermined time may be less than a time to travel a distance between the systems. FIG. 6 or 7 may represent exemplary processes for these actions. These actions may include the first user 202 pushing the pedal for the acceleration/brake 108 and the second user 204 pressing the trunk control 112 or the first user 302 pushing the pedal for the acceleration/brake 108 and the second user 304 connecting the battery 106. Other actions have been described herein and may be used by two or more persons.

At decision block 412, the processes may return back to block 406 when both actions have not been taken within the predetermined time. For example, if the first user 202 pushes the pedal for the acceleration/brake 108 but the second user 204 fails to press the trunk control 112 or fails to press the trunk control 112 within the predetermined time, the processes return back to block 406. Further, if the first user 302 pushes the pedal for the acceleration/brake 108 but the second user 304 fails to connect the battery 106 or fails to connect the battery 106 within the predetermined time, control would also be provided back to block 406. Other configurations where the two users fail to perform both actions or fail to perform them within a predetermined time may cause the processes to return to block 406 as described above.

When both actions have been performed within the predetermined time, then the processes are provided to block 414 where the transport mode may be exited. Exemplary processes for exiting the transport mode will be described in FIG. 8. This includes placing the vehicle 100 back into the normal mode and preparing the vehicle 100 for sale or place the vehicle 100 on sale. Other reasons for taking the transport mode may also be within the scope of the present disclosure, for example, testing or general use. The process may end at block 416

Figure 5:
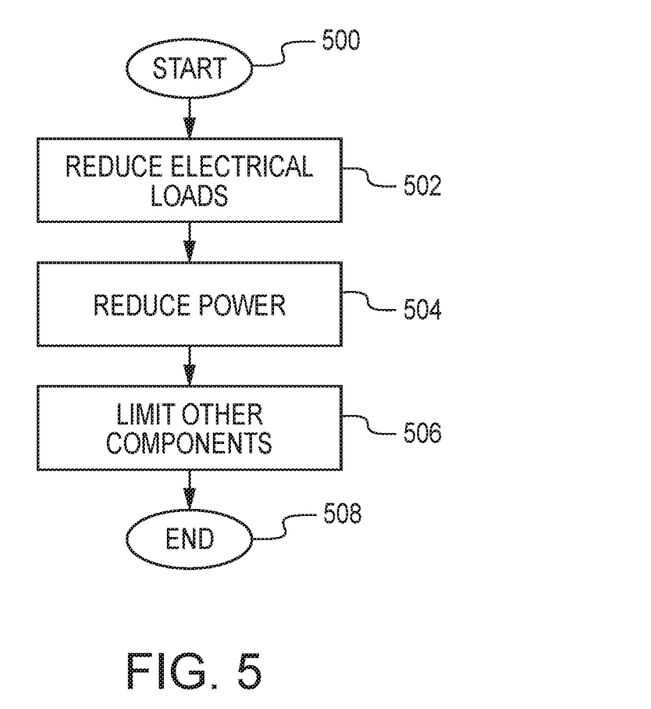
FIG. 5 is an exemplary flow chart showing illustrative processes for setting the transport mode in accordance with one aspect of the present disclosure.

FIG. 5 is an exemplary flow chart showing illustrative processes for setting the transport mode in accordance with one aspect of the present disclosure. The transport mode may be set upon manufacturing of the vehicle 100 or upon beginning the shipping process. The transport mode may also be set at other locations that may not be within the delivery process. The processes may begin at block 500. Fewer or more processes may be used depending on the electrical systems 110 or other components that may be modified during shipping.

At block 502, electrical loads may be reduced. In one embodiment, this may include removing power to vehicle functions. The power to the lighting with the vehicle 100 may be shut down so that it may not start. The lighting may include headlights, interior lights, rear brake lights or the like. Dashboard lights may also be reduced or shut down. The telematics unit with the vehicle 100 may be shut down and may not be started until taken out of transport mode. Alternatively, limited functionalities within the telematics unit may be provided. For example, navigation systems may not be used, however, settings tabs within the telematics unit may be accessed.

At block 504, and in setting up the transport mode, the power to the vehicle 100 may be reduced. The power may be reduced such that the vehicle 100 does not exceed a maximum speed limit of fifty miles per hour, for example. Acceleration of the vehicle 100 may also be reduced such that the vehicle 100 may only be transported from one delivery vehicle to another before being taken out of transport mode.

Other components within the vehicle 506 may be limited at block 506 that may be related to the electrical systems 110 or not. For example, doors and locks may be shutdown such that they may not be opened. The trunk control 112 may be limited to receiving request for opening the door but not actually opening the trunk. Other components that may be reduced or shut down in a transport mode may include vehicle sensors. These sensors may include tire, forward collision warning, backup camera, blind sport warning, seat and/or other like sensors.

The processes described above should not be construed as a sequence to place the vehicle into transport mode. For example, processes at block 506 may be performed before processes at block 502. Each vehicle manufacture may have their own process for setting a transport mode. Those processes described above are for illustrative purposes. The processes may end at block 508.

FIG. 6 is an exemplary flow chart showing illustrative processes for actions taken by a first user 202 and a second user 204 to exit the transport mode in accordance with one aspect of the present disclosure. The presented processes provide one example and should not be construed as limiting. Other processes were described above. The processes may begin at block 600.

At block 602, the ECUs 102 may determine whether the pedal for the acceleration/brake 108 has been pushed or pressed. This may be a first action that may be used to exit the transport mode. In one embodiment, the action may use one long push of the pedal for the acceleration/brake 108. The action may occur after several pushes on the pedal for the acceleration/brake 108. For example, five successive pushes on the acceleration/brake 108 may create the first action used for exiting the transport mode. Other patterns may be used to create the first action.

At decision block 604, the ECUs 102 may determine whether the first action has occurred, for example, whether the pedal for the acceleration/brake 108 has been pushed. When no first action occurs, the transport mode may not be released and the processes end at block 610. Otherwise, and when the first action occurred, at block 606, the ECUs 102 determine whether the trunk control 112 has been actuated within a predetermined time by a second user 204. Actuation of the trunk control 112 may be a single press of a button associated with the control 112. A sequence of presses on the button for the trunk control 112 may also be used for the second action. A pattern may be recognized to provide the second action, for example, three presses of the trunk button in a row. In one example, the trunk control 112 may be actuated by the user inserting their key and unlocking the trunk.

The determination at block 606 may also decide whether the second action occurred within a predetermined time of the first action. As provided earlier, the predetermined time may reflect the limitation of having a single user providing both actions, i.e., pushing the pedal of the acceleration/brake 108 and pressing the trunk control 112. In one example, the predetermined time may be five seconds. Shorter or longer durations of time may be programmed into the ECUs 102. The predetermined time may be less than a time to travel a distance between the systems.

At decision block 608, the ECUs 102 may determine whether the second action occurred. For example, the ECUs 102 may determine whether the second user 204 pressed the button for the trunk control 112. When no second action occurs, the transport mode may not be released and the processes end at block 610. Otherwise, and when the second action occurred, the processes return with a positive determination such that the transport mode may be exited. In one embodiment, the second action may occur before the first action as long as they are within the predetermined time. The processes may end at block 610.

FIG. 7 is another exemplary flow chart showing illustrative processes for actions taken by a first user 302 and a second user 304 to exit the transport mode in accordance with one aspect of the present disclosure. The presented processes provide one example and should not be construed as limiting. Other processes were described above. The processes may begin at block 700.

At block 702, the ECUs 102 may determine whether the pedal for the acceleration/brake 108 has been pushed or pressed. This may be a first action that may be used to exit the transport mode. In one embodiment, the action may use one long push of the pedal for the acceleration/brake 108. The action may occur after several pushes on the pedal for the acceleration/brake 108. For example, five successive pushes on the acceleration/brake 108 may create the first action used for exiting the transport mode. Other patterns may be used to create the first action.

At decision block 704, the ECUs 102 may determine whether the first action has occurred, for example, whether the pedal for the acceleration/brake 108 has been pushed. When no first action occurs, the transport mode may not be released and the processes end at block 610. Otherwise, and when the first action occurred, at block 706, the ECUs 102 determine whether the battery 106 has been connected within a predetermined time by a second user 304. The connection of the battery 106 may begin with the connection of the battery terminals creating the second action. Often times, the transport mode has been stored in non-erasable memory and when the battery 106 has been connected, the vehicle 100 wakes up or powers on in a previously set mode, i.e., transport mode. Alternatively, a switch within the vehicle 100 may be placed into an on position to begin the connection.

The determination at block 706 may also decide whether the second action occurred within a predetermined time of the first action. As provided earlier, the predetermined time may reflect the limitation of having a single user providing both actions, i.e., pushing the pedal of the acceleration/brake 108 and connecting the battery 106. In one example, the predetermined time may be five seconds. Shorter or longer durations of time may be programmed into the ECUs 102.

At decision block 708, the ECUs 102 may determine whether the second action occurred. For example, the ECUs 102 may determine whether the second user 304 connected the battery 106. When no second action occurs, the transport mode may not be released and the processes end at block 710. Otherwise, and when the second action occurred, the processes return with a positive determination such that the transport mode may be exited. In one embodiment, the second action may occur before the first action as long as they are within the predetermined time. The processes may end at block 710.

Figure 8:
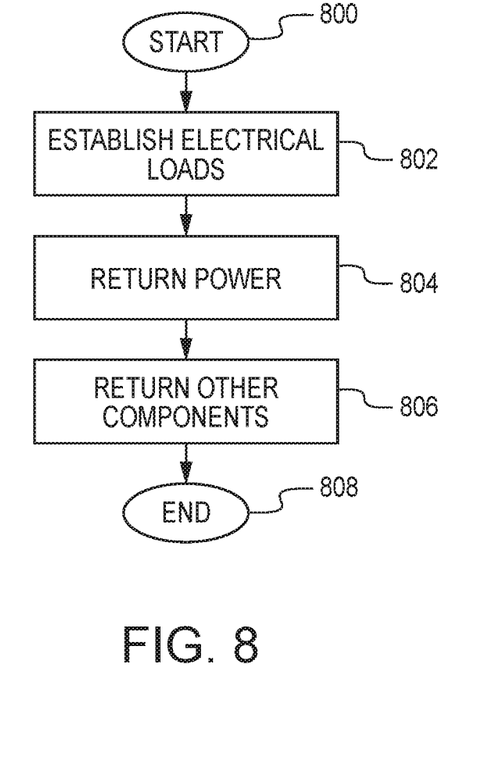
FIG. 8 is an exemplary flow chart showing illustrative processes for exiting the transport mode in accordance with one aspect of the present disclosure.

FIG. 8 is an exemplary flow chart showing illustrative processes for exiting the transport mode in accordance with one aspect of the present disclosure. The transport mode may be exited after the actions have been completed, as described above. By exiting the transport mode, the vehicle 100 may be ready to be sold or used. Fewer or more processes may be used and are not limited to those disclosed herein. The processes may begin at block 800 to place the vehicle 100 back into a normal mode.

At block 802, electrical loads may be established. In one embodiment, this may include returning power to vehicle functions. Power to the lighting of the vehicle 100 may be increased or returned so that the lights may properly work within the vehicle 100. This lighting may include headlights, interior lights, rear brake lights or the like. Dashboard lights may also be returned to normal, i.e., provide full luminosity.

The telematics unit with the vehicle 100 may also be provided with full functionalities including navigation systems and other settings.

At block 804, the power to the vehicle may be increased. The power may be increased such that the vehicle 100 may accelerate properly and exceed the maximum speed limit imposed while in the transport mode. Other components, at block 806, may be returned back to normal mode. Doors may operate normally such that they may be open and shut. Vehicle sensors may also be set to work properly.

The processes described above should not be construed as a sequence to place the vehicle into normal mode. For example, processes at block 806 may be performed before processes at block 802. Each vehicle manufacture may have their own process for setting a normal mode. Those processes described above are for illustrative purposes. The processes may end at block 808.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for taking a vehicle out of a transport mode that limits functions of the vehicle, the method comprising:
   determining whether a first action on a first system has occurred on the vehicle;
   determining whether a second action on a second system has occurred on the vehicle, wherein the first system and the second system on the vehicle are separated by a distance; and
   exiting the transport mode from the vehicle when the first action and the second action have occurred within a predetermined time, wherein the predetermined time is less than a time to travel the distance between the first system and the second system.

2. The method of claim 1, comprising determining whether an ignition is on before determining whether the first actions and second actions have occurred to exit the transport mode.

3. The method of claim 1, wherein determining whether the first action on the first system has occurred on the vehicle comprises receiving a sequence of pedal presses.

4. The method of claim 3, wherein receiving the sequence of pedal presses comprises recognizing presses on an acceleration pedal.

5. The method of claim 3, wherein receiving the sequence of pedal presses comprises recognizing presses on a braking pedal.

6. The method of claim 1, wherein determining whether the second action on the second system has occurred on the vehicle comprises receiving a trunk control request.

7. The method of claim 1, wherein determining whether the second action on the second system has occurred on the vehicle comprises receiving a battery connection.

8. The method of claim 1, wherein exiting the transport mode from the vehicle when the first action and second action have occurred comprises setting the vehicle to a normal mode.

9. The method of claim 8, wherein the predetermined time is five seconds.

10. The method of claim 8, wherein setting the vehicle at the normal mode comprises rewriting memory where the transport mode had been set.

11. A vehicle in a transport mode limiting functions of the vehicle comprising:
    a first system activated in the vehicle;
    a second system activated outside the vehicle; and
    a control system exiting the transport mode returning the functions of the vehicle when the first system and second system have been activated within a predetermined time, wherein the predetermined time is less than a time to travel between the first system and the second system.

12. The vehicle of claim 11, wherein the first system is activated by a sequence of acceleration or brake pedal presses.

13. The vehicle of claim 11, wherein the second system is a trunk control request or battery connection.

14. The vehicle of claim 11, wherein the control system activates a normal mode after exiting the transport mode.

15. The vehicle of claim 11, wherein the transport mode limiting functions comprises at least one of reducing electrical loads, reducing power and limiting other components.

16. A vehicle computing system comprising:
    at least one processor; and
    a memory operatively coupled to the processor, the memory storing program instructions that when executed by the processor, causes the processor to:
    establish a transport mode limiting functions to the vehicle;
    determine whether an in-vehicle system is activated;
    determine whether an out-of-vehicle system is activated;
    exit the transport mode when the in-vehicle system and the out-of-vehicle system are activated within a predetermined time returning normal functions to the vehicle, wherein the predetermined time is less than a time to travel between the in-vehicle system and the out-of-vehicle system.

17. The vehicle computing system of claim 16, wherein establishing the transport mode occurs before shipping.

18. The vehicle computing system of claim 16, wherein limiting functions of the vehicle comprises at least one of reducing electrical loads, reducing power and limiting other components.

19. The vehicle computing system of claim 16, wherein returning normal functions to the vehicle comprises overwriting the memory permanently exiting the transport mode.

20. The vehicle computing system of claim 16, wherein the predetermined time is five seconds.

* * * * *